United States Patent [19]
Nybakken et al.

[11] Patent Number: 5,605,657
[45] Date of Patent: Feb. 25, 1997

[54] INDUSTRIAL SOLID TIRES AND METHOD OF MANUFACTURE

[75] Inventors: George H. Nybakken, Middlebury; Richard L. Palinkas, Northfield, both of Conn.; David M. Clonch, Bristol, Va.

[73] Assignee: Uniroyal Chemical Company, Inc., Middlebury, Conn.

[21] Appl. No.: 85,713

[22] Filed: Jul. 1, 1993

Related U.S. Application Data

[62] Division of Ser. No. 882,726, May 14, 1992, abandoned.

[51] Int. Cl.⁶ ............................ B29C 39/10; B29C 45/14
[52] U.S. Cl. .......................... 264/102; 156/112; 264/259; 264/328.3; 264/328.6
[58] Field of Search .................................. 264/101, 102, 264/259, 328.2, 328.3, 328.18, 328.6; 156/112, 113

[56] References Cited

U.S. PATENT DOCUMENTS

| | | |
|---|---|---|
| 3,701,374 | 10/1972 | McGillvary . |
| 3,803,281 | 4/1974 | Fix ........................................ 264/102 |
| 3,843,577 | 10/1974 | Keil . |
| 3,959,203 | 5/1976 | Keil . |
| 4,011,189 | 3/1977 | Keil . |
| 4,045,527 | 8/1977 | Babayan et al. ........................ 264/102 |
| 4,095,637 | 6/1978 | Krishnan . |
| 4,309,378 | 1/1982 | Ganster et al. . |
| 4,379,104 | 4/1983 | Koorevaar ........................... 264/328.3 |
| 4,519,432 | 5/1985 | Schmidt et al. . |
| 4,832,098 | 5/1989 | Palinkas et al. . |
| 4,934,425 | 6/1990 | Gajewski et al. . |
| 4,970,033 | 11/1990 | DeGiovanni et al. .................. 264/102 |
| 5,023,040 | 6/1991 | Gajewski et al. ..................... 264/328.3 |

OTHER PUBLICATIONS

The Physics Of Tire Traction By D. F. Hays & A. L. Browne –1974.
Uniroyal Chemical—Vibrathane Urethane Elastomers.
Dow Corning publication, "Q2–3238 Dispersible Silicone Additive", Jun. 1980.

*Primary Examiner*—Mathieu D. Vargot
*Attorney, Agent, or Firm*—Raymond D. Thompson

[57] ABSTRACT

An industrial solid tire for heavy-load, off-road use having a cast polyurethane tire thereon is produced by a batch method. The tire is a heat cured polyurethane produced from a dispersion of a prepolymer, a curative and an amount of a silicone dispersing and lubricant agent. The amount of silicone is between 1.0 and 4.0 parts per hundred of the prepolymer. A method for manufacturing the tire is included.

2 Claims, 4 Drawing Sheets

INDUSTRIAL SOLID TIRES AND METHOD OF MANUFACTURE

This is a Divisional of application Ser. No. 07/882,726 filed May 14, 1992, now abandoned.

BACKGROUND OF THE INVENTION

This invention relates to solid tires made of elastomeric material used in industrial applications and more particularly to improved solid tires able to carry extreme loads while being used in off-road, rugged terrain.

Conventional solid tires on the market today generally are used for slow-speed industrial applications that require the tire to have properties such as being puncture-proof, able to carry relatively heavy loads, and have good resistance to wear and tear. The tires must resist tearing and abrasion when used on broken and uneven surfaces, such as typically found in mills, mines, quarries and the like. Such uses frequently cause premature failure of the tire, due to tears and separation of the tire from the rim. This premature failure is a particular problem in tires made to withstand unusually heavy loads.

The prior art teaches that polyurethane materials, such as those used for solid tires of this invention, can have their abrasion resistance improved by the addition of silicone. The prior art also teaches that, for each composition of elastomer used in a tire, there is a definite relation between skid resistance and wear resistance, such that an improvement in wear resistance results in a degradation in skid resistance. Thus, under the teaching of the prior art, one would expect that the addition of silicone to polyurethane, to increase wear resistance would result in a tire that has decreased skid resistance. In fact, such silicones are added to castable urethanes to act as slip agents. Thus, there is a need for a solid, castable polyurethane tire that combines the characteristics of good abrasion resistance, good tear resistance, without sacrificing good skid resistance.

The foregoing illustrates limitations known to exist in conventional solid tires. It is apparent that it would be advantageous to provide an alternative directed to overcoming one or more of the limitations set forth above. Accordingly, a suitable alternative is provided including features more fully discussed hereinafter.

SUMMARY OF THE INVENTION

In one aspect of the invention, this is accomplished by providing a solid tire having a castable polyurethane tire mounted on a rim, the tire being a heat cured polyurethane, the polyurethane being produced from a dispersion consisting essentially of liquid prepolymer, a preselected critical amount of a liquid silicone, the preselected critical amount being 1.0 to 4.0 pph of the prepolymer, and a liquid curative.

In a second aspect, the method of manufacturing a wheel incorporating the tire is accomplished by providing a liquid prepolymer; combining with the prepolymer a preselected critical amount of a liquid silicone, the preselected critical amount being between 1.0 and 4.0 pph of the prepolymer; combining with the prepolymer a liquid curative; casting the prepolymer into a tire mold; curing the combination to form a polyurethane tire; removing the tire from the mold; and adhering the tire to a tire rim.

DETAILED DESCRIPTION

Figure 1:
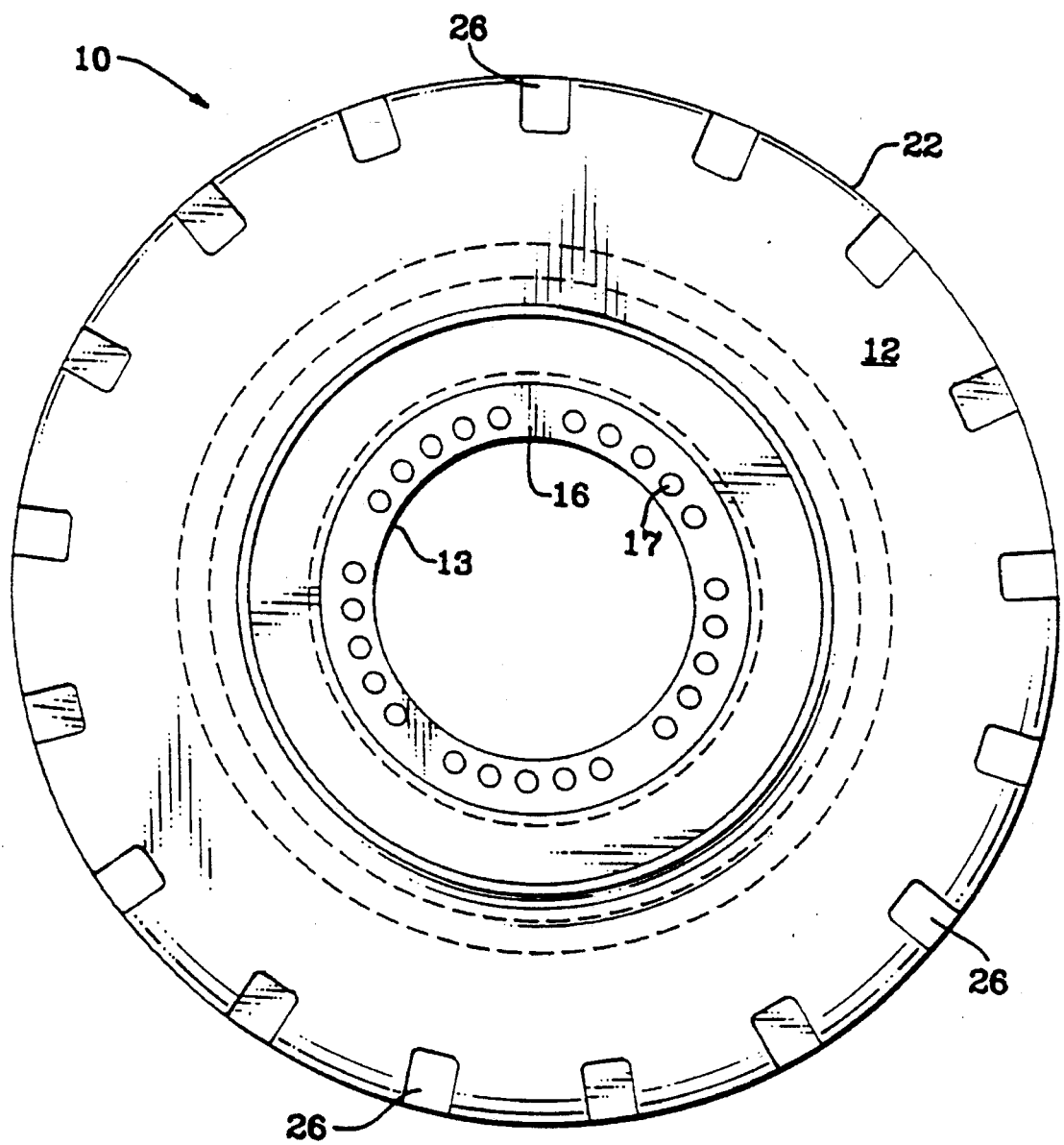
FIG. 1 is a face view of a wheel incorporating the improved solid tire.

The wheel 10 shown in the drawings generally includes a circular rim 11 (see FIG. 2) carrying on its outer surface a solid tire 12 circling the rim 11 and having on the inside of the rim 11 a front hub 13 and a rear hub 14 welded or otherwise joined to respective front and rear edges of the rim 11 and extending around its interior. The front hub 13 further includes a thicker outer section 15 and a thinner inner section 16 joined to the outer section 15 and carrying a series of mounting holes 17 circularly spaced around it adjacent its inner periphery for receiving fasteners used to mount the wheel on the mounting flange of a spindle or axle of a vehicle. The outer peripheral edges of both the front and rear hubs 13 and 14 carry beveled edges 18 smoothly joining with the outer periphery 19 of the rim 11. Both the outer periphery 19 and the two beveled edges 18 form the surface carrying the tire 12.

The solid tire 12 is an elastomer material which is both tough and resilient and will provide maximum load carrying capacity, long term durability and a good ride for the vehicle. Specific material that forms part of this invention will be discussed later. In one form of the invention, the elastomer tire is cast on the periphery 19 of the rim 11 in a manner such that the tire is attached to the surface 19 sufficiently to prevent the tire 12 from sliding (rotating) on the rim 11 during use. As illustrated in the drawings, the tire 12 includes an outer periphery or tread face 22, spaced sidewalls 23 and 24, and an inner periphery 25, engaging the periphery 19 of the rim 11. The tread face 22 of the tire 12 is illustrated as containing a rudimentary tread in the form of circumferentially spaced grooves 26 extending laterally inward from the sidewalls 23 and 24 and ending about halfway across the tread face 22, with the tread grooves 26 opening on opposite sidewalls 23 and 24 being circumferentially offset from each other. The depth of the tread grooves 26 is about as deep as the usual tread in a tire.

Figure 2:
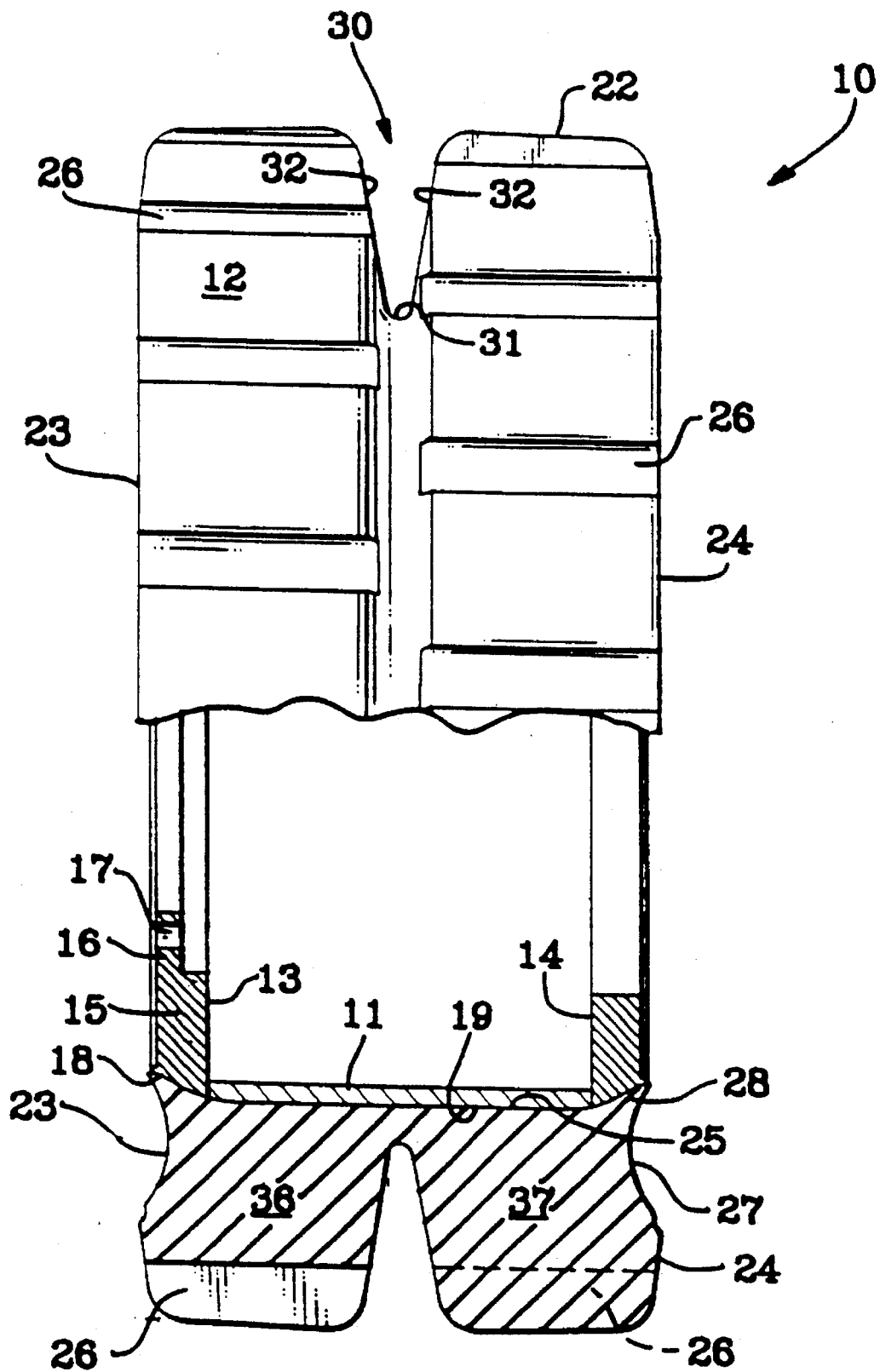
FIG. 2 is a view looking at the wheel from the tread face of the solid tire with a portion of the wheel and tire cut away to show the tire in cross section.
Figure 3:
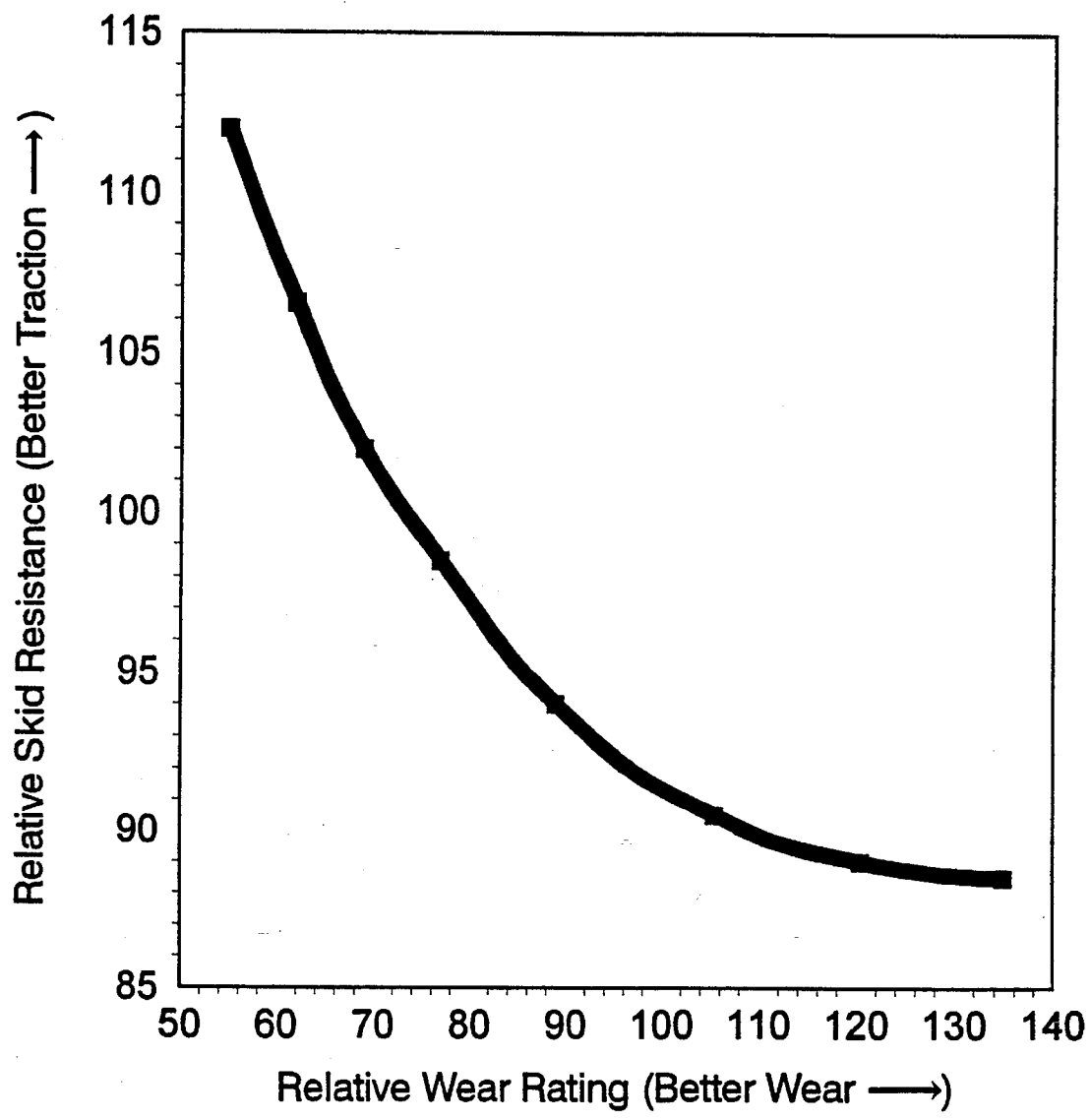
FIG. 3 is a graph showing the prior art teaching of the relationship between relative skid resistance and relative wear rating.

Each of the sidewalls 23 and 24 of the tire 12, as shown in FIG. 2, has its inner two thirds, measured radially, formed as a concave surface 27 terminating at the inner diameter of the tire 12. The inner periphery 25 of the tire 12, seated on the outer surface 19 of the rim 11, extends outwardly over the beveled edges 18, and forms with the concave surface 27 a relatively thin lip 28 circling the inner diameter of the tire 12. Making the lip 28 thin lowers the stresses in this part of the tire making it less likely to fail in this area.

We have discovered that a cast polyurethane tire having a critical amount of a specific silicone dispersed in the prepolymer, before curing, provides surprisingly good resistance to split-tear failure, in combination with high abrasion resistance, without a decrease in skid resistance. The invention will be further described in conjunction with the following examples.

EXAMPLES

Test specimens of the cured polyurethane of this invention were prepared according to the following steps.

A heated (180 degrees F.) polyester polyol prepolymer is provided. The prepolymer is degassed to remove moisture and air at about 180 degrees F. at 29 inches Hg. A small amount of the prepolymer is decanted and to this decanted material is added a preselected amount of liquid silicone, at ambient temperature. The amount of the silicone added is the total amount to be added to the prepolymer so as to provide between 1.0 and 4.0 parts per hundred (pph) of the total prepolymer to be used for the part to be made. Color pigment of about 1% by weight can be added, but this is optional.

The mixture of prepolymer and silicone is recombined with the balance of the degassed prepolymer and all is mixed and heated to 180 degrees F. A diamine curative, heated to approximately 240 degrees F., is added. The amount of curative is determined by its equivalent weight and the intention to be at 100% stoichiometry (plus or minus 5%).

The urethane mixture is poured into a preheated (212 degrees F.) mold and allowed to cure for 2 hours at 212 Degrees F. After curing, the part is demolded and post cured for 16 hours at 212 degrees F. Specimens so produced were in the form of cylindrical rods for abrasion testing and rectangular blocks for split-tear testing.

Abrasion tests were performed by mounting specimens having 1 square inch of surface area on a lathe, so as to position the sample against an abrasive carborundum wheel rotating in the lathe chuck at a surface speed of 0.47 feet per second. The samples were spring loaded against the wheel with a contact pressure of 11.7 psi. The wear was measured in inches per hour, by measuring the change in dimension of the samples.

Figure 4:
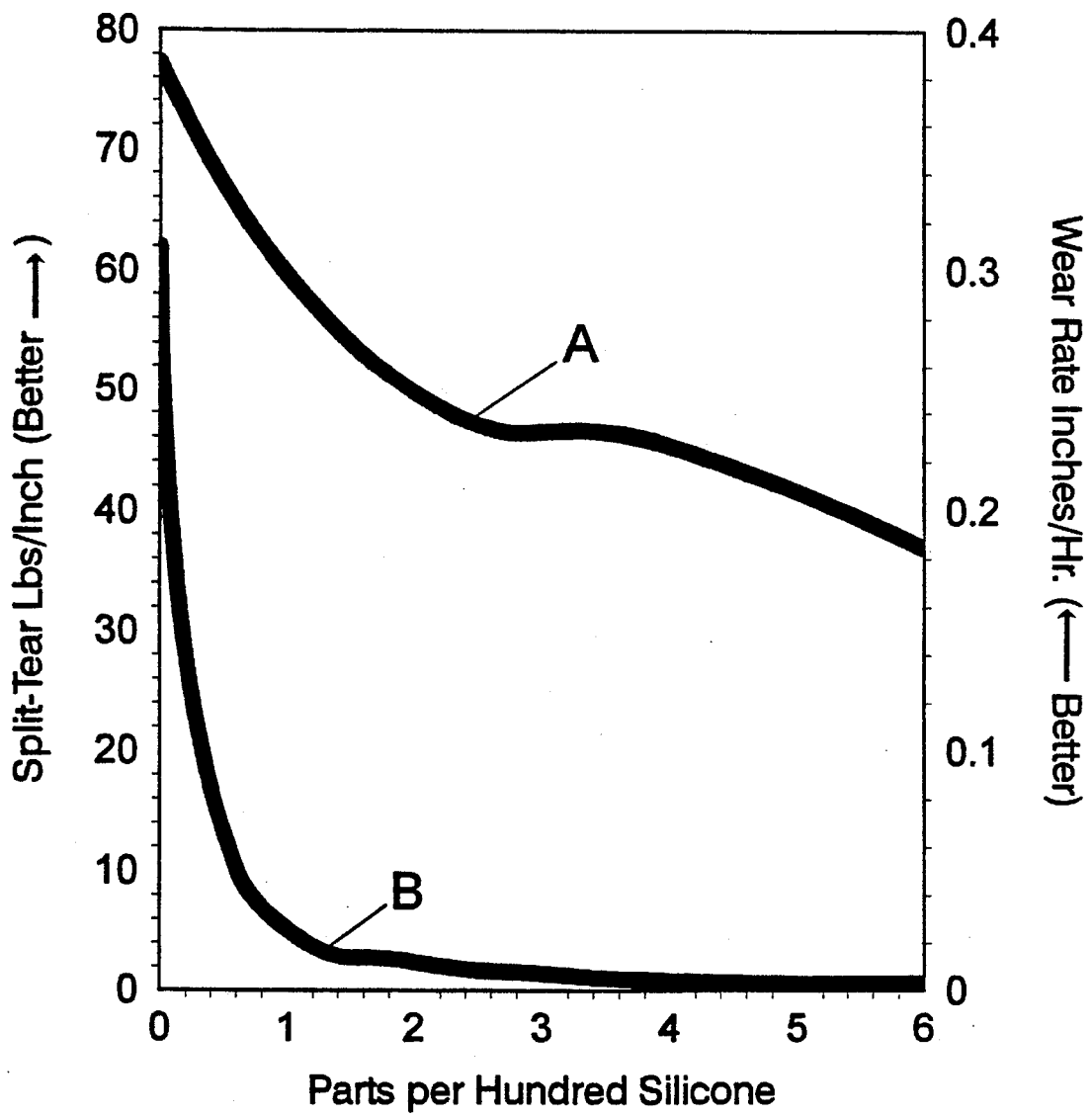
FIG. 4 is a graph showing two curves, each plotted against separate vertical coordinates and a common horizontal coordinate, illustrating good split-tear resistance combined with abrasion resistance over the critical range of the polyurethane tire composition of this invention.

Results are shown in Table I, and in FIG. 4.

TABLE I

| AMT. SILICONE* (pph) | WEAR RATE In./Hr. |
| --- | --- |
| 0 | 0.31 |
| 1/2 | 0.067 |
| 1.0 | 0.026 |
| 2.0 | 0.012 |
| 3.0 | 0.007 |
| 4.0 | 0.004 |

*100% Stoichiometry

Split-tear tests were conducted according to test method ASTM D-470. Results are shown in TABLE II and FIG. 4.

TABLE II

| AMT. SILICONE* (pph) | SPLIT-TEAR Lbs./In. |
| --- | --- |
| 0 | 77.4 |
| 2.0 | 49.8 |
| 4.0 | 45.3 |
| 6.0 | 36.9 |

*100% Stoichiometry

The preferred polyurethane is a heat cured, castable polyurethane cured with a chain extender. More specifically it is a TDI ether or ester polyol prepolymer or MDI ether or ester polyol prepolymer cured with a diamine or diol chain extender. Even more specifically it is a toluenediisocyanate-polyester polyol prepolymer cured with methylenebisorthochloraniline.

The preferred curative is referred to as 4,4'-methylene bis(2-chloroaniline) (known as MBOCA), although other equivalent curatives will do, such as diethyl toluene diamine (DETA) and dimethyl thio toluene diamine (DMTDA) available from Ethyl Corporation under the tradenames Ethacure 100 and Ethacure 300. Also suitable is a methylenedianiline-NaCl complex, available from Uniroyal Chemical Company, Inc. under the tradename Caytur.

The preferred silicone is a reactive silicone or a reactive silicone oil, where reactivity is provided by an active hydrogen termination, such as amine terminated or mercapto terminated. More specifically, the silicone is a hydroxyl-endblocked organopolysiloxane lubricant. Even more specifically, the silicone is polydimethyl siloxane hydroxy-terminated.

The preferred reactive silicone, polydimethyl siloxane hydroxy-terminated, is provided by Dow Chemical company under the product designation of Q2-3238 Dispersible Silicone Additive. This material is described in the U.S. Pat. No. 4,011,189 to Keil. The description of the lubricant additive and dispersing agent in this patent is specifically incorporated by reference herein. As used herein the term "silicone" includes the mixtures of additives and dispersants disclosed in this patent.

Examples of such additives include siloxanes such as trimethylsilyl endblocked polydimethylsiloxane; trimethylsilyl endblocked trifluoropropylmethylsiloxane; mixtures of either of the above two siloxanes with a siloxane copolymer comprised of $SiO_2$ units and $R_3SiO_{1/2}$ units; liquid polyolefins; mineral oils and other petroleum oils and solvents. This list is not intended to be exhaustive but instead illustrates the variable additives that can be dispersed by the dispersing agents that follow.

One silicone dispersing agent useful herein is a siloxane copolymer consisting essentially of $SiO_2$ units, $(CH_3)_3SiO_{1/2}$ units and $D(CH_3)_2SiO_{1/2}$ units in which D is a polyoxyethylene polymer having a molecular weight of at least 500 or a polyoxyethylene-polyoxypropylene copolymer having a molecular weight of at least 2500 and the polyoxypropylene portion constitutes up to 50 mole percent of the copolymer, said D being attached to the silicon atom via a silicon-carbon bond, and the ratio of the $SiO_2$ units to the total $(CH_3)_3SiO_{1/2}$ and $D(CH_3)_2SiO_{1/2}$ units is in the range of 1:0.4 to 1:1.2.

A second silicone dispersing agent useful herein is a siloxane copolymer reaction product derived from heating a mixture of a siloxane consisting essentially of $SiO_2$ units and $(CH_3)_3SiO_{1/2}$ units in which the ratio of the $SiO_2$ units to $(CH_3)_3SiO_{1/2}$ units is in the range of 1:0.4 to 1:1.2, and a hydroxylated polyoxyethylene polymer having a molecular weight of at least 500 or a hydroxylated polyoxyethylene-polyoxypropylene copolymer having a molecular weight of at least 2500 and the polyoxypropylene portion constitutes up to 50 mole percent of the copolymer.

The third silicone dispersing agent useful herein is a polydimethylsiloxane-organic copolymer in which the polydimethylsiloxane portion has a molecular weight of at least 1400 and the organic portion consists essentially of a polyoxyethylene polymer having a molecular weight of at least 500 or a polyoxyethylene-polyoxypropylene copolymer having a molecular weight of at least 1000 and the polyoxypropylene portion constitutes no more than 50 mole percent of organic portion of the copolymer, said organic portion being attached to silicon atoms via silicon-carbon bonds.

Another silicone dispersing agent useful herein is a siloxane-organic copolymer which is the reaction product produced by heating a mixture of a hydroxylated polydimethylsiloxane having a molecular weight of at least 1,400 and a hydroxylated polyoxyethylene having a molecular weight of at least 500 or a hydroxylated polyoxyethylene-polyoxypropylene copolymer having a molecular weight of at least 1,000 and the polyoxypropylene constitutes up to 50 mole percent of the organic portion of the copolymer.

Referring now to FIG. 4, there is shown the unexpected results of the composition range of this invention. As shown in curve A, the split-tear characteristics of the cured polyurethane is maximum, as measured in force (lbs/inch), at 0.0 percent silicone. The split-tear resistance begins to rapidly deteriorate as the amount of the silicone goes from 0 to 1.0 pph. However, unexpectedly, in the range of between 2.0 and 4.0 pph, the curve undergoes a dramatic change of slope to show that the split-tear resistance is remaining unexpectedly high. Above 4.0 pph, the split-tear resistance resumes its dramatic fall-off.

In combination with this unexpected split-tear resistance, there is shown in Curve B a significantly high abrasion resistance, measured in inches/hr., in the same range of silicone composition that shows the high split-tear resistance. We believe that this combination of high abrasion resistance and high split-tear resistance in the range provides a tire that has increased wear life.

Several wheels incorporating the tire of this invention were produced and field tested for skid resistance. The procedure followed was to mount onto a vehicle a wheel incorporating a tire to be tested. The vehicle is chained to a pole anchored in concrete. Between the vehicle and the pole is connected a device that can measure the pulling force (in pounds) exerted by the vehicle, as the engine is activated. The pulling force was increased and the skid behavior was visually observed for various prior art and inventive tire compositions. The results are shown in Table III.

throughout the life of the tire. Other active hydrogen terminated lubricants are available besides hydroxy-terminated polydimethyl siloxane. Surface treated Ultra High Molecular Weight PolyEthylene (UHMWPE) and surface treated particles sold under the registered trademark "Teflon" by E.I. DuPont De Nemours and Company are also available. The UHMWPE particles can be treated with a coupling agent such as titanate (for example Kendric's KR46B) to provide the active hydrogen termination coating. The treated "Teflon" particles are available as GUR 412 from Hoechst-Celanese Company.

While we have disclosed the method of manufacture of the cured polyurethane as a batch method, with degassing, decanting and adding of silicone to a decanted portion of prepolymer, it would be equivalent to provide the process in a continuous or semi-continuous process wherein such steps are incorporated into a continuous type machine, well known in the art as a three stream machine. The prepolymer and curative, in correct proportions are added in two streams. A third stream is used to add the silicone. The silicone is mixed with a plasticizer, in a ratio of 2/1 silicone to plasticizer. A preferred plasticizer is sold under the trade name Benzoflex 9-88-SG, supplied by Velsicol Chemical Corporation.

The actual casting methods to be used are conventional and well known in the art.

When casting the polyurethane on the rim 11, it is useful to coat the periphery 19 of the rim 11 with a good bonding agent such as Lord's Chemlock 213 or 218, or Morton International's Thixon 405 or 406 to insure a satisfactory bond between the polyurethane and the rim surface 19. The use of the relatively thin lips 28 along with the bonding

TABLE III

| | LBS. PULL AT FIRST SLIP OF TIRE | | |
|---|---|---|---|
| WHEELS TESTED | PRIOR ART RUBBER | PRIOR ART POLYURETHANE (WITHOUT SILICONE) | INVENTION COMPOSITION @ 3 pph SILICONE |
| 2 FRONT | 7,200 | 6,160 | 6,160 |
| 2 REAR | 12,400 | 13,360 | 13,360 |
| 2 FRONT AND 2 REAR | 19,640 | 21,560 | 21,560 |

As Table III shows, the tires of this invention did not suffer a loss in skid resistance, as compared to prior art polyurethane tires, even though the prior art teaches that the silicone should decrease the skid resistance. Also, the tires of this invention showed better skid resistance than the prior art rubber tires in two of the three categories tested. When this skid characteristic is viewed in combination with the enhanced abrasion and tear resistance, as shown in FIG. 4, it is apparent that this polyurethane material for tires shows an unexpected combination of properties.

Without being bound to the theory, we believe that the invention works because the NCO groups on the ends of the polyol that make up the prepolymer are effective sites for active hydrogen terminated lubricants; that is, the active hydrogen terminated lubricant can chemically bond with the prepolymer and thus become part of the subsequent polyurethane. Having the additive lubricant as part of the polyurethane structure provides two necessary features. First, the lubricant cannot bleed to the surface where the excess can reduce the tire traction. Second, this non-bleeding effect guarantees the wear advantage provided will remain agent serves to reduce the stress on the bond along the inner edge of the tire 12 which otherwise is likely to be the place where failures of the tire 12 are likely to begin.

Having described the invention, what is claimed is:

1. A batch method for producing a solid polyurethane tire for heavy-load, off-road use, the polyurethane of the tire having better wear resistance than a polyurethane article that is different only in having lesser amounts of liquid silicone, the polyurethane of the tire having equal skid resistance to a polyurethane article that is different only in having no liquid silicone, the method comprising the steps of:

(a) providing a liquid polyol prepolymer;

(b) adding to said prepolymer a preselected amount of a liquid silicone, said preselected amount of liquid silicone being between 1.0 and 4.0 parts per hundred of said prepolymer, wherein the combined total amount of said silicone and said prepolymer is sufficient in quantity for use in combination with one tire rim;

(c) adding and mixing an isocyanate and a curative into said prepolymer, thereby producing a prepolymer mixture;

(d) casting said prepolymer mixture into a tire mold incorporating a tire rim;

(e) curing said prepolymer mixture to form a polyurethane tire on said incorporated rim; and (f) removing said tire from said mold.

2. The batch method of claim 1 which includes immediately preceding the silicone-adding step the additional steps of:

(a) degassing said prepolymer;

(b) decanting a preselected volume of said degassed prepolymer;

(c) adding to said decanted prepolymer said preselected amount of said liquid silicone; and (d) recombining and mixing said decanted prepolymer with said degassed prepolymer.

\* \* \* \* \*